US009977112B2

(12) United States Patent
Chawla et al.

(10) Patent No.: US 9,977,112 B2
(45) Date of Patent: May 22, 2018

(54) OBJECT LOCALIZATION WITH RFID INFRASTRUCTURE

(75) Inventors: Kirti Chawla, Charlottesville, VA (US); Gabriel Robins, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 645 days.

(21) Appl. No.: 13/876,078

(22) PCT Filed: Sep. 23, 2011

(86) PCT No.: PCT/US2011/053067
§ 371 (c)(1),
(2), (4) Date: Mar. 26, 2013

(87) PCT Pub. No.: WO2012/047559
PCT Pub. Date: Apr. 12, 2012

(65) Prior Publication Data
US 2013/0181869 A1    Jul. 18, 2013

Related U.S. Application Data

(60) Provisional application No. 61/386,646, filed on Sep. 27, 2010.

(51) Int. Cl.
*G01S 5/02* (2010.01)
*G06K 7/00* (2006.01)
(Continued)

(52) U.S. Cl.
CPC .............. *G01S 5/02* (2013.01); *G01S 13/758* (2013.01); *G01S 13/87* (2013.01); *G06K 7/0008* (2013.01);
(Continued)

(58) Field of Classification Search
CPC .......................... G01S 13/758; G06K 7/10079
(Continued)

(56) References Cited

U.S. PATENT DOCUMENTS 5,977,913 A    11/1999   Christ
6,641,042 B1   11/2003   Pierenkemper et al.
(Continued)

FOREIGN PATENT DOCUMENTS

WO    WO-2007131839 A1    11/2007
WO    WO-2009018156 A1    2/2009
(Continued)

OTHER PUBLICATIONS

"International Application Serial No. PCT/US2011/053067, International Preliminary Report on Patentability dated Apr. 11, 2013", 5 pgs.
(Continued)

*Primary Examiner* — Tashiana R Adams
*Assistant Examiner* — Helena H Seraydaryan
(74) *Attorney, Agent, or Firm* — Schwegman Lundberg & Woessner, P.A.

(57) ABSTRACT

Object localization with an radio-frequency identification (RFID) infrastructure is described. A plurality of transmission power levels established by an RFID reader can be searched to determine a measurement power level corresponding to a target. A region that includes the target can then be determined using information about a physical relationship between the RFID reader and a reference location via correlating the measurement power level to a reference power level corresponding to the reference location.

21 Claims, 6 Drawing Sheets

(51) Int. Cl.
*G06K 7/10* (2006.01)
*G01S 13/75* (2006.01)
*G01S 13/87* (2006.01)
*G01S 7/40* (2006.01)

(52) U.S. Cl.
CPC .. *G06K 7/10079* (2013.01); *G01S 2007/4013* (2013.01)

(58) Field of Classification Search
USPC ........................................................ 342/458
See application file for complete search history.

(56) References Cited

U.S. PATENT DOCUMENTS

| | | | |
|---|---|---|---|
| 7,119,738 B2 | 10/2006 | Bridgelall et al. | |
| 7,246,746 B2 | 7/2007 | McNamara et al. | |
| 7,295,114 B1 | 11/2007 | Drzaic et al. | |
| 7,319,397 B2 | 1/2008 | Chung et al. | |
| 7,374,103 B2 | 5/2008 | Gene et al. | |
| 7,486,189 B2 | 2/2009 | Koerner et al. | |
| 7,522,926 B2 | 4/2009 | Chu et al. | |
| 7,605,688 B1 | 10/2009 | Seah | |
| 7,619,532 B2 | 11/2009 | Amir | |
| 7,663,485 B2 | 2/2010 | Kim et al. | |
| 7,683,782 B2 | 3/2010 | Christopher | |
| 7,693,681 B2 | 4/2010 | Yamada | |
| 2006/0049250 A1* | 3/2006 | Sullivan | G06K 7/0008 235/385 |
| 2006/0125694 A1 | 6/2006 | Dejanovic et al. | |
| 2006/0261938 A1* | 11/2006 | Lai | G06K 7/0008 340/505 |
| 2007/0115137 A1 | 5/2007 | Lyon et al. | |
| 2008/0100439 A1 | 5/2008 | Rinkes | |
| 2008/0278289 A1 | 11/2008 | Gantner | |
| 2009/0315679 A1 | 12/2009 | Bauchot et al. | |
| 2010/0201520 A1* | 8/2010 | Stern | G01S 13/878 340/572.1 |
| 2010/0293176 A1* | 11/2010 | Burukhin | G06F 17/30988 707/759 |
| 2011/0260922 A1* | 10/2011 | Zhang | G01S 5/0252 342/451 |

FOREIGN PATENT DOCUMENTS

| | | |
|---|---|---|
| WO | WO-2010011176 A1 | 1/2010 |
| WO | WO-2012047559 A2 | 4/2012 |

OTHER PUBLICATIONS

"International Application Serial No. PCT/US2011/053067, International Search Report dated May 3, 2012", 3 pgs.
"International Application Serial No. PCT/US2011/053067, Written Opinion dated May 3, 2012", 3 pgs.
Abowd, D., et al., "Charting past, present and future research in ubiquitous computing", ACM Transactions on Computer-Human Interaction, vol. 7, No. 1, (2000), 29-58.
Alippi, C., et al., "A statistical approach to localize passive RFIDs'", IEEE International Symposium on Circuits and Systems (ISCAS 2006), (2006), 843-846.
Bekkali, A., et al., "RFID indoor positioning based on probabilistic RFID map and Kalman filtering", IEEE International Conference on Wireless and Mobile Computing, Networking and Communications (WIMOB 2007), (2007), 7 pgs.
Blewitt, G., et al., "Rapid determination of earthquake magnitude using GPS for tsunami warning systems", Geophysical Research Letters, vol. 33No. L11309, (2006), 4 pgs.
Bolotnny, Leonid, et al., "Multi-Tag RFID Systems", International Journal of Internet Protocol Technology, vol. 2, Nos. 3-4, 13 pgs.
Bolotnyy, L., et al., "The case for multi-tag RFID systems", IEEE International Conference on Wireless Algorithms, Systems and Applications (WASA 2007), (2007), 13 pgs.

Chae, Heesung, et al., "Combination of RFID and Vision for Mobile Robot Localization", IEEE International Conference Intelligent Sensors, Sensor Networks and Information Processing (ISSNIP 2005), (2005), 75-80.
Chawla, Kirti, et al., "Efficient RFID-Based Mobile Object Localization", IEEE Intl Workshop on Selected Topics in Mobile and Wireless Computing (STMWC 2010), (2010), 683-690.
Chawla, Kirti, et al., "Object Localization Using RFID", IEEE Intl Symposium on Wireless and Pervasive Computing (ISWPC 2010), (2010), 301-306.
Choi, Byoung, et al., "Mobile Robot Localization Scheme Based on RFID and Sonar Fusion System", IEEE Intl Symposium on Industrial Electronics (ISIE 2009), (2009), 1035-1040.
Choi, Jae Sung, et al., "Localization Systems using Passive UHF RFID", Intl Joint Conference on INC, IMS and IDC, (2009), 1727-1732.
Estrin, D., et al., "Connecting the Physical World with Pervasive Networks", IEEE Pervasive Computing, vol. 1, No. 1, (2002), 56-89.
Finkenzeller, Klaus, "RFID Handbook: Fundamentals and Applications in Contactless Smart Cards and Identification", Wiley and Sons, Inc., (2003), 446.
Fontelo, Paul, et al., "The PDA as a Portal to Knowledge Sources in a Wireless Setting", Telemedicine Journal and e-Health, vol. 9, No. 2, (2003), 141-147.
Hahnel, Dirk, et al., "Mapping and Localization with RFID Technology", IEEE Intl Conference on Robotics and Automation (ICRA 2004), (2004), 6 pgs.
Han, Soonshin, et al., "An Efficient Localization Scheme for a Differential-Driving Mobile Robot Based on RFID System", IEEE Transactions on Industrial Electronics, vol. 54, No. 6, (2007), 3362-3369.
Hekimian-Williams, Cory, et al., "Accurate Localization of RFID Tags Using Phase Difference", IEEE Intl Conference on RFID (RFID 2010), (2010), 8 pgs.
Hightower, J., et al., "Location Systems for Ubiquitous Computing", IEEE Computer, vol. 34, No. 8, (2001), 57-66.
Jin, G., et al., "An Indoor Localization Mechanism Using Active RFID Tag", IEEE Intl Conference on Sensor Networks, Ubiquitous and Trustworthy Computing (SUTC 2006), (2006), 4 pgs.
Joho, D., et al., "Modeling RFID Signal Strength and Tag Detection for Localization and Mapping", IEEE Intl Conference on Robotics and Automation (ICRA 2009), (2009) 3160-3165.
Liu, X., et al., "Ferret: RFID Localization for Pervasive Multimedia", Lecture Notes in Computer Science, vol. 4206—2006, (2006), 19 pgs.
Mattern, F., "The Vision and Technical Foundations of Ubiquitous Computing, Upgrade", The European Online Magazine for the IT Professional, vol. 2 No. 5, (2001), 5 pgs.
Merrell, R. C., et al., "Information Support for the Ambulant Health Worker", Telemedicine Journal and e-Health, vol. 10, No. 4, (2005), 432-436.
Milella, A., et al., "RFID Tag Bearing Estimation for Mobile Robot Localization", IEEE Intl Conference on Advanced Robotics (ICAR 2009), (2009), 1-6.
Muthukrishnan, K., et al., "Towards Smart Surroundings—Enabling Techniques and Technologies for Localization", Lecture Notes in Computer Science, vol. 3479—2005, (2005), 13 pgs.
Ni, L., et al., "LANDMARC: Indoor Location Sensing Using Active RFID", Wireless Networks, 10, (2004), 701-710.
Nikitin, P. V., et al., "Antennas and Propagation in UHF RFID Systems", IEEE Intl Conference on RFID (RFID 2008), (2008), 277-288.
Romer, K., et al., "Smart Identification Frameworks for Ubiquitous Computing Applications", Journal on Wireless Networks, vol. 10, No. 6, (2005), 689-700.
Romer, K., et al., "Smart Playing Cards—A Ubiquitous Computing Game", Journal on Personal and Ubiquitous Computing, vol. 6 Nos. 5/6, (2002), 10 pgs.
Satyanarayanan, M., "Pervasive Computing: Vision and Challenges", IEEE Personal Communication, vol. 8, No. 4, (2001), 10-17.

(56) References Cited

OTHER PUBLICATIONS

Schilit, B. N., "Mega-Utilities Drive Invisible Technologies", IEEE Computer, vol. 36, No. 2, (2003), 97-99.
Senta, Y., et al., "Machine Learning Approach to Self-Localization of Mobile Robots Using RFID Tag", IEEE/ASME Intl Conference and Advanced Intelligent Mechatronics, (2007), 1-6.
Seo, D., et al., "Localization Algorithm for a Mobile Robot Using iGS", Intl Federation of Automatic Control—World Congress, vol. 17, No. 1, (2008), 742-747.
Sweeney, P. J., "RFID for Dummies", Wiley Publishing, Inc., (2005), 408 pgs.
Vogt, H., "Efficient Object Identification with Passive RFID Tags", Proc. Int. Conf. Pervasive Computer 2002, Lecture Notes in Computer Science 2414, (2002), 16 pgs.
Vorst, P., et al., "Self-Localization with RFID Snapshots in Densely Tagged Environments", IEEE/RSJ Intl Conference on Intelligent Robots and Systems (IROS 2008), (2008), 6 pgs.
Wang, Chong, et al., "RFID-Based 3-D Positioning Schemes", 26th IEEE Intl Conference on Computer Communications (INFOCOM 2007), (2007), 1235-1243.
Want, R., et al., "RFID—A Key to Automating Everything", Scientific American, (2008), 56-65.
Zhang, Y., et al., "Localization and Tracking of Passive RFID Tags Based on Direction Estimation", Intl Journal of Antennas and Propagation, vol. 2007, No. 17426, (2007), 9 pgs.
Zhao, Y., et al., "VIIRE—Active RFID-Based Localization Using Virtual Reference Elimination", IACC/US-NSF Intl Conference on Parallel Processing (ICPP 2007), (2007), 8 pgs.

\* cited by examiner

OBJECT LOCALIZATION WITH RFID INFRASTRUCTURE

CLAIM OF PRIORITY

This application is a national stage filing of International Application No. PCT/US2011/053067, filed, Sep. 23, 2011, which claims the benefit of priority under 35 U.S.C. 119(e) to U.S. Provisional Patent Application Ser. No. 61/386,646, titled "Method, System and Computer Program Product for Low-cost Power-provident Object Localization using Ubiquitous RFID Infrastructure," filed on Sep. 27, 2010, which are hereby incorporated by reference herein in their entirety.

TECHNICAL FIELD

This document pertains generally, but not by way of limitation, to object localization with an RFID infrastructure.

BACKGROUND

Locating objects (e.g., object localization) within a physical space (e.g., a box in a warehouse) has generally involved manually tracking the object. For example, such manual tracking can include scanning a location barcode when storing or moving the object in the warehouse. Attempts to automate object localization have included using radio-frequency identification (RFID) systems. RFID systems generally employ one or more RFID readers that wirelessly interrogate one or more RFID tags. RFID tags can be passive, battery-assisted passive, or active. Generally, RFID tags receiving an interrogatory signal from an RFID reader will respond with information that can be used to uniquely identify the RFID tag. RFID readers are generally designed and installed so as to cover a specified physical area (e.g., a shopping cart at a checkout register). The physical area is generally limited to a region where the RFID can reliably interrogate tags (e.g., RFID tags associated with the goods in the shopping cart). Thus, RFID systems generally perform object tracking (e.g., whether an object passed through an area) rather than object localization.

OVERVIEW

In some approaches RFID systems have been modified to attempt object localization. Such modifications have included rotationally scanning the environment with the RFID reader interrogation transmission or mounting RFID readers on the target object itself. In some approaches, additional non-RFID equipment has been added to these systems. The additional equipment can, in some examples, include light based (e.g., cameras, vision sensors, laser, or infrared), sound based (e.g., ultrasonic), or tactile sensors (e.g., range-finding, image capture, etc.), such as to augment the information provided by the RFID reader. However, such an approach using additional equipment can have disadvantages, such as not being compatible with generally-available RFID readers, or adding additional cost or complexity to an object localization system. In other approaches, the additional sensors have been mounted on the object or throughout the environment.

The present inventors have recognized, among other things, that existing RFID object localization systems still often fail to rapidly or accurately determine a target object location. This can be due to RFID communication challenges inherent in real-world environments such as variable RFID tag sensitivity, radio frequency (RF) interference (e.g., from other RF transmissions), attenuation or scattering by objects in or surrounding the target environment (e.g., metals, liquids, etc.), fading, or other factors that can reduce localization accuracy. As discussed above, some approaches to address these problems rely on complex sensor packages (e.g., additional light, optical, or tactile sensors) that increase costs and yield mixed results. Further, such additional sensors can themselves be subject to environmental sources of error, such as requiring line of sight to reference positions (e.g., for laser or sonic range-finders) or requiring a well-lit environment (e.g., for systems using a vision system with visual landmarks). Other approaches have attempted to use sophisticated modelling approaches, such as statistical models.

In contrast, the present inventors have, among other things, developed techniques and apparatus that can reduce the complexity and increase the speed and accuracy of RFID object localization, such as via searching for a target using a plurality of RFID reader transmission power levels to determine a measurement power level corresponding to a target. Such a measurement power level can be an RFID reader transmission level that can be used to reliably estimate a distance between the RFID reader and the object for which localization information is sought.

A region (e.g., physical space) containing the target can thus be determined via correlating the measurement power level to a physical relationship (e.g., distance, direction, angle, or any combination thereof) between the RFID reader and the target. For example, the region can be determined using information about the physical relationship between the RFID reader and a reference location via correlating the measurement power level to a reference power level corresponding to the reference location. Thus, for example, the transmission power to target distance is calibrated regardless of the RF environment by empirically measuring transmission powers capable of successfully interrogating a reference location. Such calibration can include performing a transmission power level search on a reference location having a known physical relationship to the RFID reader and correlating those measurements to the measurement power level discovered in a target search.

In an example, the target can be stationary or mobile (e.g., a product on an assembly line) and can include one or more RFID tags in a variety of configurations. In an example, one or more search strategies can be used to search the plurality of transmission power levels for the measurement power level. In an example, region information from other RFID readers can be used to refine the region discussed above. In an example, the empirical reference power measurements can be periodically determined (e.g., re-calibrated). In an example, the RFID tags used for the targets, reference locations, or both can be categorized (e.g., based on response sensitivity or one or more other parameters) to further assist in calibrating the transmission power level-to-distance relationship.

By relating the target's position to the RFID reader via correlating the measurement power level to a reference power level corresponding to a reference location, object localization can be readily and accurately determined. Further, this can be accomplished without adding complex equipment (e.g., additional sensors) and without requiring extensive modelling of the target search environment. Thus, the present subject matter allows object localization to be accomplished more quickly, accurately, and cheaply than existing approaches.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
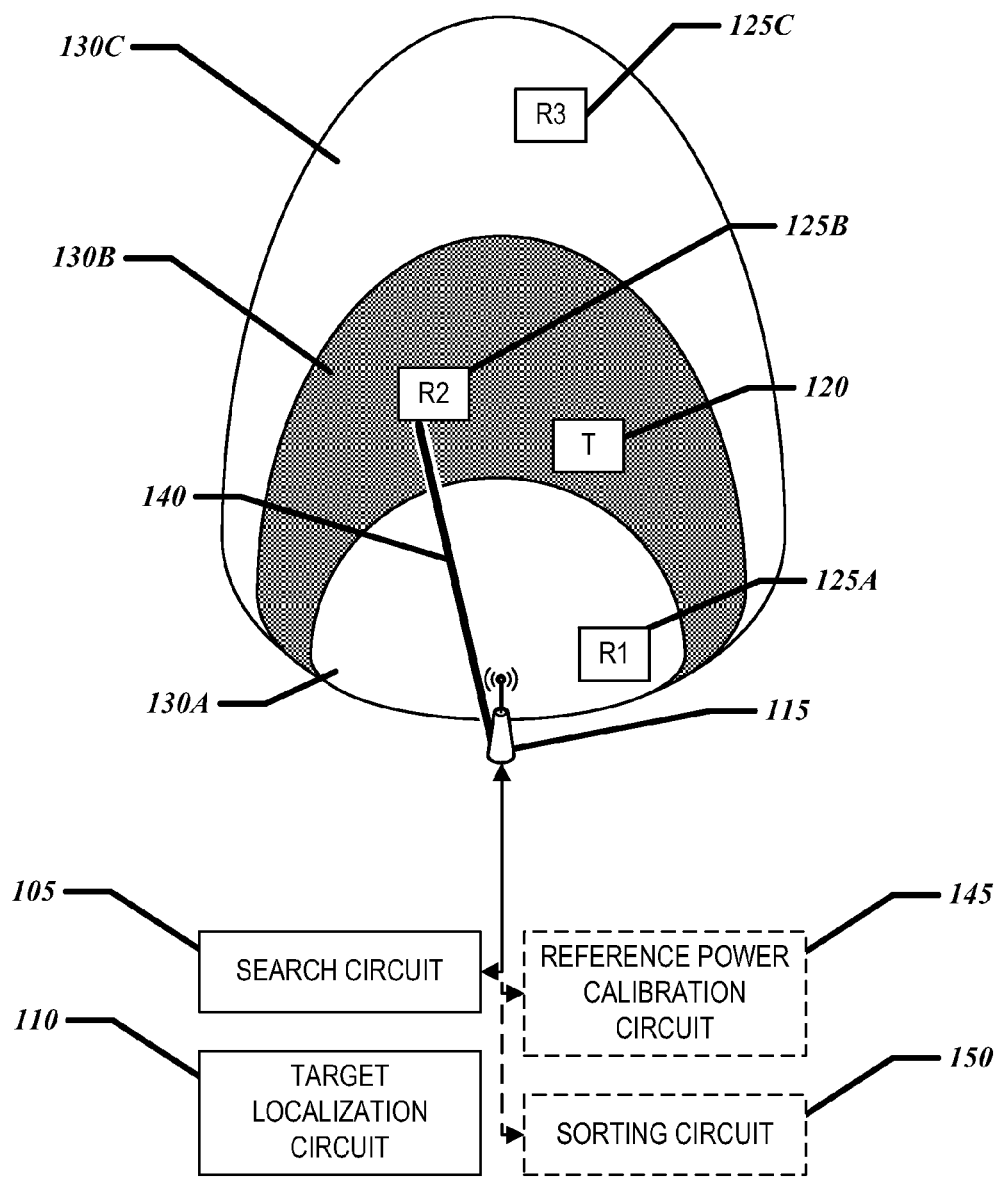
FIG. 1 illustrates generally an example of a system for object localization with an RFID infrastructure, according to an embodiment.

FIG. 1 illustrates an example of a system 100 for object localization with an RFID infrastructure. System 100 can include a search circuit 105 communicatively coupled to an RFID reader 115 and a target localization circuit 110. In an example, system 100 can optionally include a reference power calibration circuit 145 communicatively coupled to the RFID reader 115. In an example, system 100 can optionally include a sorting circuit 150 communicatively coupled to the RFID reader 115.

The search circuit 105 can be configured to search a plurality of transmission power levels (e.g., transmission power levels 130A through C) established by the RFID reader 115. The search circuit 105 can also be configured to determine a measurement power level 130B corresponding to the target 120.

In an example, the measurement power level 130B can be a transmission power level established by the RFID reader 115 to interrogate the target 120 at or near the limit of the target's sensitivity. For example, the measurement power level 130B can be the smallest of the plurality of transmission power levels 130A through C to interrogate the target 120 and provoke a response from the target 120. In an example, the measurement power level 130B be a transmission power level immediately above or below a transmission power level that provokes a response from the target 120. In an example, the target's sensitivity can be reception sensitivity (e.g., did the target receive the interrogation signal) or the target's sensitivity can be determined by reception, at the RFID reader 115, of a response to the interrogation. Such a sensitivity can also be expressed as a frame-error-rate (FER), a bit-error-rate (BER), a success or failure rate of attempted interrogations during a specified duration, a minimum receivable power level specified at an input to an RFID tag's receiver, or using one or more other criteria.

In an example, the target 120 can be mobile (e.g., a cart moving through a warehouse). In an example, the target 120 can be stationary (e.g., a container placed within a warehouse). In an example, the target 120 can include a single RFID tag, or an RFID tag cluster including a plurality of RFID tags. In an example, at least two of the RFID tags in an RFID tag cluster can be positioned orthogonally to each other, such as positioned orthogonally in a two dimensional plane or in three-dimensional space.

In an example, the target 120 can include one or more RFID multi-tags. More examples are provided below with respect to FIGS. 3-5B. For example, the target 120 can include one or more RFID readers and can use one or more of the search techniques described with regard to the RFID reader 115 to position the target 120 with respect to one or more reference locations 125A through C (e.g., to measure and report to the target localization circuit 110). In an example, the measured and reported data can be used to facilitate the search circuit's search for the target 120 by, for example, choosing RFID readers likely to be capable of localizing the target, a subset of the plurality of transmission power levels 130A through C likely to encompass the region of the target, or relevant reference locations 125A through C. In an example, a likeliness of an RFID reader to be able to successfully interrogate a target can be determined when a reference level exists for a reported reference location and a corresponding RFID reader 115.

In an example, the search circuit 105, can be configured to search a range of available transmission power levels 130A through C, by modulating the transmission power level of the RFID reader 115. For example, a linear search of the transmission power levels can be conducted by starting at a transmission power level (e.g., at the low or high end of the RFID reader's transmission power range) and sequentially increasing or decreasing an interrogatory transmission power level through the range of transmission power levels 130A through C until a termination condition is met (e.g., starting at a low transmission power level and ending when the measurement power level is found or at the high end of the RFID reader's transmission power level range). The following pseudo code illustrates an example including a linear search, where "TargetID" can represent a target's unique identification (e.g., via unique identifier of an RFID tag), "PowerStep" can represent the increase or decrease in RFID reader 115 transmission power level (e.g., 3 dBm), and "PowerDirection" can represent whether transmission power is stepped up or down while performing the search:

```
if (PowerDirection = LowToHigh) then
    Power = MinPowerLevel
    repeat
        if (Power > MaxPowerLevel) then
            return NotFound
        end
        set reader power level to Power
```

```
        search for targets
            until successful or time-out
        if (TargetID is found) then
            return Power
        end
        Power = Power + PowerStep
    end
else
    Power = MaxPowerLevel
    TargetPower = MaxPowerLevel
    repeat
        if (Power < 0) then
            return NotFound
        end
        set reader power level to Power
        search for targets
            until successful or time-out
        if (TargetID is found) then
            TargetPower = Power
        else
            return TargetPower
        end
        Power = Power − PowerStep
    end
end
```

In this example linear search, the returned value(s) (e.g., "TargetPower") can represent the minimum transmission power level to detect the target 120 (e.g., at or near the target's 115 sensitivity). In an example, the returned value can be the measurement power level 130B. In an example, "MinPowerLevel" can represent the lowest power level with which the RFID reader 115 can transmit. In an example, "MinPowerLevel" can represent any of the plurality of transmission power levels 130A through C except the highest transmission power level the RFID reader 115 is capable of using. For example, if information were provided, such as by the binary search described below, that the measurement power level 130B were within a subset of the plurality of transmission power levels 130A through C, the "MinPowerLevel" can be set to the lowest transmission power level in the subset. In this way the search space can be narrowed. In an example, "MaxPowerLevel" can represent the highest power level with which the RFID reader 115 can transmit. In an example, "MaxPowerLevel" can represent any of a plurality of transmission power levels 130A through C except the lowest transmission power level the RFID reader 115 is capable of using. In an example, the "MinPowerLevel" is less than and not equal to the "MaxPowerLevel".

In an example, the search circuit 105 can be configured to conduct a binary search of the plurality of transmission power levels 130A through C. A binary search can include determining one or more of an initial high or low bound for the search and selecting a transmission power level, to which the target 120 interrogation transmission power level will be modulated, between these bounds (e.g., adding the high and low bounds and dividing by two). Iterations of the binary search can continue by determining whether the target is found at the selected transmission power level, adjusting the bounds accordingly, and selecting a new transmission power level between the new bounds. If the selected transmission power level is halfway between the two bounds, the search space can be halved for successive iterations. The binary search can halt when a termination condition is met. In an example, the termination condition can be a numerical proximity of the low and high bounds (e.g., if the high bounds minus the low bounds is less than the termination condition, the search will end). In an example the termination condition can be a limit for a total number of iterations, or a timeout (time elapsed without finding the target 120), or using one or more other conditions. The following pseudo code illustrates an example binary search, with the terms the same as those defined above with respect to the linear search:

```
TargetPower = MaxPowerLevel + 1
TargetFound = False
repeat
    Power = (MinPowerLevel + MaxPowerLevel) / 2
    set reader power level to Power
    search for targets
        until successful or time-out
    if (TargetID is found) then
        TargetFound = True
        if (TagrgetPower > Power) then
            TargetPower = Power
        end
    end
    if (TargetFound) then
        MaxPowerLevel = Power
    else
        MinPowerLevel = Power
    end
    if ((MaxPowerLevel−MinPowerLevel)) ≤
        PowerStep) then
        return TargetPower
    end
```

As with the linear search, various terms, such as "MinPowerLevel" and "MaxPowerLevel" can be varied to search an entire range of transmission power levels 130A through C, or only a subset (e.g., transmission power levels 130A through B).

In an example, The RFID reader 115 can comprise multiple devices (e.g., multiple simple RFID readers or antennas). The multiple devices can contemporaneously interrogate the target 120 from a single location such as to provide a multiplexed measurement. In an example, the plurality of transmission power levels 130A through C can be divided among these devices, for example, such that each device searches a subset of the plurality of transmission power levels 130A through C. For example, RFID reader 115 can include a device A and a device B. Device A can be assigned transmission power levels 130A through B while device B can be assigned transmission power level 130C. When the search circuit 105 searches the plurality of transmission power levels 130A through C, devices A and B can constrain their respective searches to their assigned transmission power levels. In an example, devices A and B can be configured to search contemporaneously (e.g., simultaneously or nearly simultaneously such as during a single iteration or round of measurements). In an example, each device can correspond to a single one of the plurality of transmission power levels. Thus, the plurality of transmission power levels can be searched in parallel for the measurement power level.

In an example, the search circuit 105 can be configured to simultaneously search for multiple measurement power levels respectively corresponding to multiple targets (e.g., a parallel target search). For example, while searching the plurality of RFID reader transmission power levels 130A through C, if a target 120 is found at a given power level (transmission power level 130B), that transmission power level 130B is the measurement power level 130B for that target 120, but the search can continue to find other targets at that transmission power level 130B or other transmission power levels (e.g., transmission power levels 130A or 130C).

In an example, the search circuit 105 can be configured to combine one or more search techniques (e.g., linear, binary, or parallel transmission power level searching, or parallel target searching, or using one or more other techniques) to search the plurality of transmission power levels 130A through C. For example, a binary search can be used (e.g., for a fixed number of iterations) to find a subset of the plurality of transmission power levels (e.g., transmission power levels 130A through B) containing the measurement power level 130B, and then a linear search can be used to find the measurement power level 130B.

The target localization circuit 110 can be configured to determine a region (e.g., a two or three-dimensional area) that includes the target 120 using the measurement power level. For example, the target localization circuit 110 can be configured to modify the Friis transmission equation, given below as Equation 1, with information from at least one of full faraday cycle analysis or path-loss contour mapping to address the current RF environment.

$$\frac{P_R}{P_T} \propto G_R G_T \left(\frac{\lambda}{4\pi D}\right)^N \qquad \text{EQ. 1}$$

Here, $P_R$ is the power transmitted by the RFID reader 115, $P_T$ is the power received at the target 120, $G_R$ and $G_T$ are the respective antenna gains of the RFID reader 115 and the target 120, $\lambda$ is the radio-wave wavelength, D is the distance between the RFID reader 115 and the target 120, and N specifies the signal's strength based on operating conditions. For example, when there is no environmental interference or RF occlusion, N can be two, while in more challenging environments (e.g., environments with one or more interferences such as multi-path scattering effects), N can be a range from about three to about six. In an example, the RFID system attributes $\lambda$, $G_R$, and $G_T$ can be fixed via design (e.g., they can represent design parameters or can be measured). In an example, N can be inferred experimentally by, or for, the system 100. Thus, by knowing the power levels at the RFID reader 115 and the target 120, the distance between them can be determined. Alternatively, knowing the distance between the RFID reader 115 and target allows the received power level at the tags to be determined.

In an example, the target localization circuit 110 can be configured to determine the region using information about a physical relationship 140 (e.g., distance, direction, elevation, etc.) between the RFID reader 115 and a reference location (e.g., R2 125B) via correlating the measurement power level 130B with a reference power level corresponding to the reference location. For example, a reference location 125B can be found by searching, for example, a database of reference location information, using the measurement power level 130B as the key. Then, the physical relationship 140 can be used, for example as a proxy for the target's 120 position, to determine the region of the target location. In an example, information about a given reference location can include a margin of error, such as a radius, to define the region around a chosen reference location 125B. In an example, the region can be the area covered by the antenna pattern at the reference power level minus the antenna pattern of a smaller transmission power level, such as the shaded region in FIG. 1.

In an example, the localization circuit 110 can be configured to determine a refined region that includes the target 120 using information about two or more regions established using respective measurement power levels determined corresponding to respective RFID readers. In an example, the refined region can be the geometric intersection of the regions. In an example, the additional regions can be used to select the reference location 125B from a plurality of reference locations 125A through C. Additional examples are given below with respect to FIG. 2.

In an example, the localization circuit 110 can be configured to select the reference location 125B from the plurality of reference locations 125A through C via determining a greater affinity between the measurement power level 130B and the reference power level than between the measurement power level 130B and other reference power levels corresponding to other reference locations (e.g., reference power levels 130A and 130C respectively corresponding to reference locations R1 125A and R3 125C). In an example, affinity can be defined by one or more metrics, techniques, or heuristics to compare the measurement power level 130B to the reference power level. Additional examples are given below with respect to FIG. 2.

The reference power calibration circuit 145 can be configured to search the plurality of transmission power levels 130A through C for the reference power level. The reference power level can be a transmission power level established by the RFID reader 115 to interrogate the reference location (e.g., R1 125A) at or near the limit of the reference location's sensitivity. In an example, a reference location's sensitivity can be determined in the same manner described above with respect to the target's sensitivity. For example, the RFID reader 115 can scan (e.g., by performing a linear search of the plurality of transmission power levels 130A through C, or using one or more other techniques) a low transmission power level 130A and find reference location R1 125A. Thus, transmission power level 130A can be the reference power level for R1 125A. This process can be repeated and reference power levels 130B and 130C can respectively be found for corresponding reference locations R2 125b and R3 125C. Although only shown for R2 125B, each of the reference locations R1 125A through R3 125C can have a corresponding physical relationship 140 to the RFID reader 115 (e.g., a distance range, an angular range such as including one or more of an azimuthal or elevational component, or one or more other relationships). In an example, the reference power levels and corresponding reference locations R1 125A through R3 125C can be stored, in a database, such as for later use. In an example, the calibration circuit 145 can recalibrate (e.g., perform the search again) to determine the reference power levels, such as specified intervals (e.g., every minute, hour, day, month) or after a defined triggering event. Such triggering events can be environmental (e.g., a temperature drop or rise, a humidity change or extremum as indicated by a sensor, or in response to a user inputs such as after a reconfiguration of the target space such as a factory or warehouse rearrangement). Such calibration can also or instead be performed during target 120 localization activities, such as in situations where one or more reference locations are available persistently.

In an example, the sorting circuit 150 can be configured to classify (e.g., bin) a plurality of RFID tags into one or more categories. In an example, the localization circuit 110 can be configured to determine the region including the target 120 using information about the physical relationship 140 between the RFID reader 115 and the reference location R2 125B, and information about a categorization of one or more of an RFID tag (or RFID multi-tag) located at or near the target 120 or the reference location R2 125B. In an example, the classification can be based on RFID tag sensitivity, such as reception, transmission, or detection sensitivity. In an example, the target 120 and the reference locations R1 125A through R3 125C can comprise respective RFID tags comprising the same category of sensitivity range. Thus, variations in RFID tags can be eliminated to produce more accurate localization results without additional equipment or without requiring complex calculations. Additional examples are given below with respect to FIGS. 6 through 7.

Figure 2:
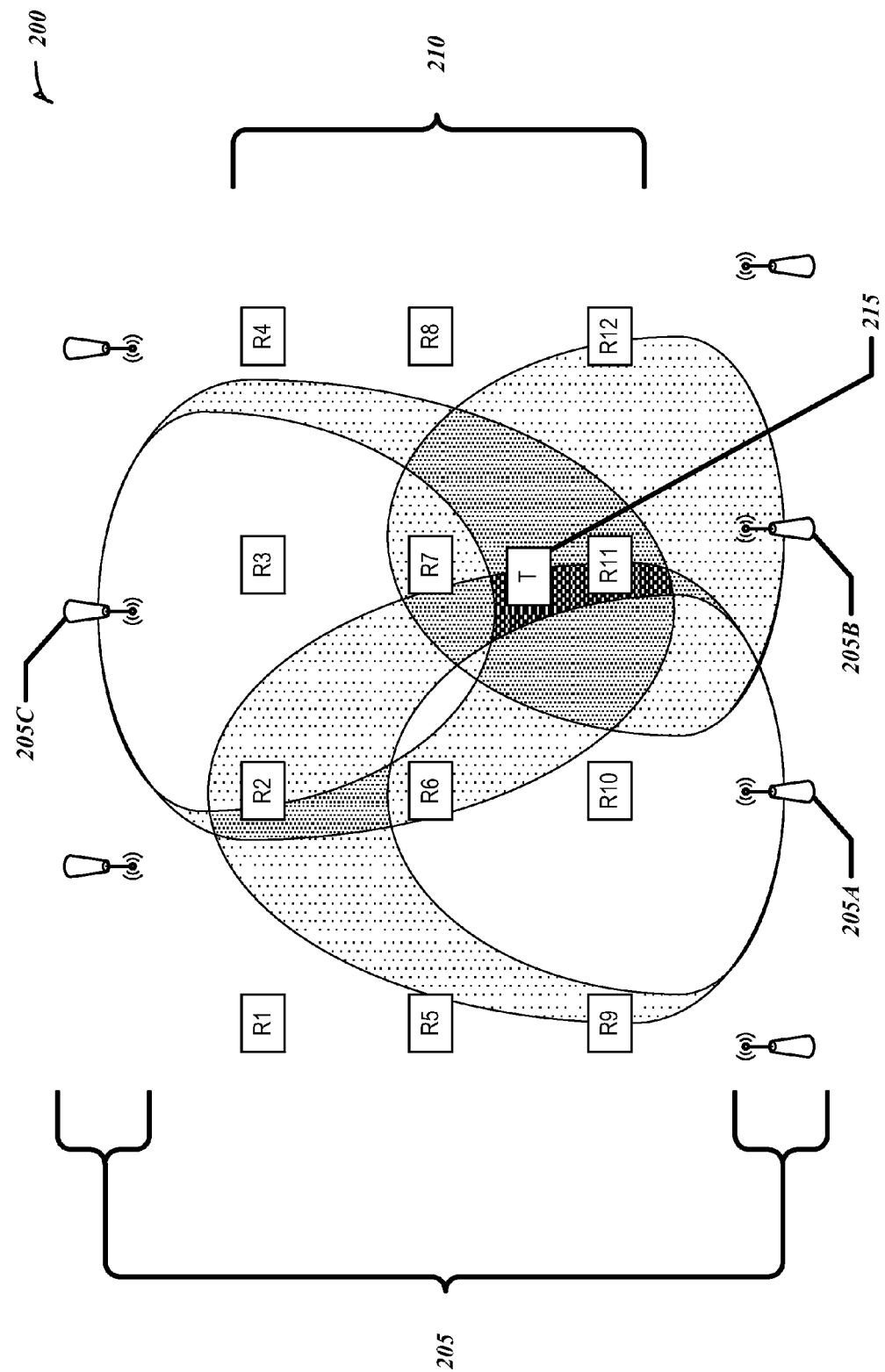
FIG. 2 illustrates generally an example of a system for object localization using multiple RFID readers and reference locations, according to an embodiment.

FIG. 2 illustrates an example of a system 200 for object localization using multiple RFID readers 205 and reference locations 210. In FIG. 2, three of the RFID readers 205, RFID readers 205A through C, have determined measurement power levels corresponding to the target 215, illustrated as the lightly shaded regions. In the example of FIG. 2, two transmission power levels are illustrated. The measurement power levels for the RFID readers 205A and 205C correspond to a high transmission power level and the measurement power level for RFID reader 205B corresponds to a low transmission power level. However, in general, the number of transmission power levels available at any given reader can be as many as the range of transmission power divided by the minimum power level step size or increment supported by transmission circuitry of the RFID reader 205. In FIG. 2, medium shading illustrates generally where two of the measurement power level regions intersect and the darkest shading illustrates generally the intersection of all three of the measurement power level regions.

In an example, the reference locations 210 can be regularly spaced according to a pattern, such as the grid shown in FIG. 2, or using one or more other arrangements. In an example, the pattern can be three-dimensional (e.g., reference locations 210 can be dispersed within a three-dimensional volume according to the pattern such as a grid on a floor and on a ceiling of a room, or using one or more other arrangements). In an example, the density of reference location 210 placement can vary within the environment (e.g., to achieve relatively greater localization accuracy in specified regions).

In an example, the target localization circuit 110 can be configured to determine an intersection of the antenna pattern regions corresponding to the measurement power level to select a reference location, such as R11 within the dark shaded region.

As discussed above, the target localization circuit 110 can be configured to determine an affinity between the measurement power level and the reference power level. Several examples below include heuristics that can be used to determine such an affinity. The following terms apply to all of the following heuristics ($H_1$ through $H_{10}$):

T=Target 215
$R_J$=Reference location J
H=Heuristic
Power=transmission power level
M=Number of RFID readers 205 used
B=Set of neighbour reference locations 210
$\Delta_I(R)$=|Power(T)−Power(R)| using reader I (e.g., the absolute value of subtracting the reference power level for reference location R from the measurement power level corresponding to the target 215 at an RFID reader such as RFID reader 205A)
J, K=Iteration variables for neighbourhood reference locations 210
L=Iteration variable for heuristics Further, each of these heuristics use region information from one or more RFID readers 205 to select one or more reference locations 210.

Heuristic 1

In an example, this heuristic can determine an absolute difference between one or more reference power levels and the measurement power level, at one or more RFID readers 205, to select one or more reference locations 210. Four example variants ($H_1$ through $H_4$) are given below:

$$H_1: \min_{\forall J}\left(\sum_{I=1}^{M}\Delta_I(R_J)\right)$$

$$H_2: \min_{\forall J,K;J\neq K}\left(\sum_{I=1}^{M}\Delta_I(R_J)+\sum_{I=1}^{M}\Delta_I(R_K)\right)$$

$$H_3: \min_{\forall J,K\in B;J\neq K}\left(\sum_{I=1}^{M}\Delta_I(R_J)+\sum_{I=1}^{M}\Delta_I(R_K)\right)$$

$$H_4: \min_{\forall J,K\in B;J\neq K}\left(\sum_{I=1}^{M}\Delta_I(R_J)+\sum_{I=1}^{M}\Delta_I(R_K)\right) \text{ s.t. } \sum_{I=1}^{M}\Delta_I(R_J)<\sum_{I=1}^{M}\Delta_I(R_K)$$

Heuristic 2

In an example, this heuristic can compute the absolute difference of the reference power levels and the measurement power levels of at least two orthogonally-positioned (not shown) RFID readers 205. Two example variants ($H_5$ through $H_6$) are given below:

$$H_5: \min_{\forall J,K;J\neq K}(\Delta_J(T)+\Delta_K(T))$$

$$H_6: \min_{\forall J,K\in B;J\neq K}(\Delta_J(T)+\Delta_K(T))$$

Heuristic 3

In an example, this heuristic can compute the square root of the sum of the squares of the absolute difference between the reference power levels and the measurement power level. Four example variants are given below:

$$H_7: \min_{\forall J}\left(\sqrt{\sum_{I=1}^{M}\Delta_I(R_J)^2}\right)$$

$$H_8: \min_{\forall J,K;J\neq K}\left(\sqrt{\sum_{I=1}^{M}\Delta_I(R_J)^2}+\sqrt{\sum_{I=1}^{M}\Delta_I(R_K)^2}\right)$$

$$H_9: \min_{\forall J,K\in B;J\neq K}\left(\sqrt{\sum_{I=1}^{M}\Delta_I(R_J)^2}+\sqrt{\sum_{I=1}^{M}\Delta_I(R_K)^2}\right)$$

$$H_{10}: \min_{\forall J,K\in B;J\neq K}\left(\sqrt{\sum_{I=1}^{M}\Delta_I(R_J)^2}+\sqrt{\sum_{I=1}^{M}\Delta_I(R_K)^2}\right) \text{ s.t. } \sqrt{\sum_{I=1}^{M}\Delta_I(R_J)^2}<\sqrt{\sum_{I=1}^{M}\Delta_I(R_K)^2}$$

Heuristic 4

In an example, this heuristic can compute a minimum difference between the reference power level and measurement power level over all of the reference locations obtained using any of Heuristics 1 through 3. An example of this heuristic is given below:

$$H_{11}: \min_{\forall L}(H_L)$$

Note that, using the above heuristics, some reference locations 210 can be eliminated. For example, the measurement power level found at RFID reader 205A matches the reference power levels of reference locations 210 including references R2, R5, R7, R9, and R11. The measurement power level found at RFID reader 205B matches the reference power levels of reference locations 210 R7, R11, and R12. The measurement power level found at RFID reader 205C matches the reference power levels of reference locations 210 R2, R6, and R11. Using, for example Heuristic $H_1$, R11 would yield a value of about zero because there is no difference between the reference power level and the measurement power level for any of the RFID readers 205A through C. In this illustrative example, the same cannot be said for any of the other reference locations 210. In an example, a reference location out of an RFID reader's range, such as R2, can be out of RFID reader 205B's range and can be assigned an arbitrarily high reference power value. This can help eliminate clearly erroneous (or irrelevant) reference locations 210.

Figure 3:
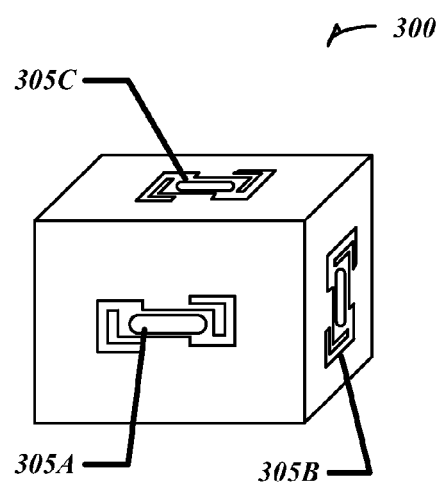
FIG. 3 illustrates generally an example of a target with RFID tags, according to an embodiment.

FIG. 3 illustrates an example of a target 300 that can include one or more RFID tags such as 305A through C. The RFID tags 305A through C can be arranged in a variety of ways to increase the likelihood that the target 300 can be successfully interrogated. In an example, the RFID tags 305A through C can be positioned orthogonally to each other as illustrated. In an example, the RFID tags 305A through C can be arranged in other geometric relationships (e.g., in parallel) to match any of the transmission or reception characteristics of an RFID tag to a goal, such as detection sensitivity or detection reliability, among others. In an example, any one of the RFID tags 305A through C can be considered the target 300 when interrogated by the RFID reader 115. In an example, readings from a plurality of the RFID tags 305A through C or other information about the RFID tags 305 A through C can be aggregated to represent the target. For example, an average measurement power level of the RFID tags 305A through C can be the measurement power level for the target 300.

Figure 4:
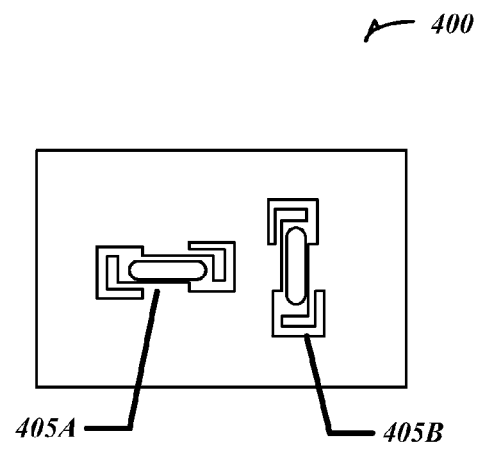
FIG. 4 illustrates generally an example of an RFID multi-tag, according to an embodiment.

FIG. 4 illustrates an example of an RFID multi-tag 400. In an example, RFID tags 405A and 405B can be positioned orthogonally to each other as described above with respect to FIG. 3, however, other arrangements of the RFID tags 405A through B can also be used. In an example, a planar multi-tag, as illustrated in FIG. 4, can be a label or other configuration such as to be affixed (e.g., via adhesive) to a target 120 or included as a portion of the target 120. In an example, one of the RFID tags 405A through B can be considered the target 120 when interrogated by the RFID reader 115. In an example, both RFID tags 405A and 405B can be considered the target 102 in combination, such as averaging the measurement power level for each. In an example, the RFID multi-tag 400 can include more than two RFID tags. In an example, the RFID multi-tags 400 can be embedded in a variety of environmental objects, such as carpets, wallpaper, shelves, to serve as reference locations. In an example, the RFID multi-tag 400 can have a variety of different geometrical arrangements, including a vertically-stacked orthogonal structure.

Figure 5A:
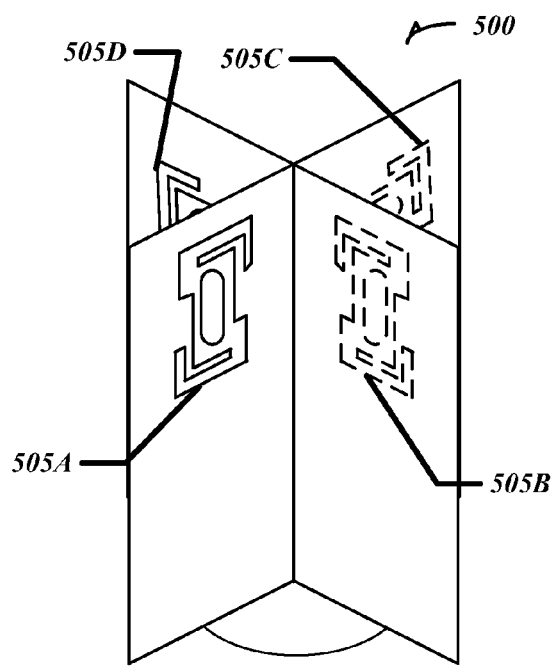
FIGS. 5A and B illustrate generally an example of a four-way multi-tag, according to an embodiment.
Figure 5B:
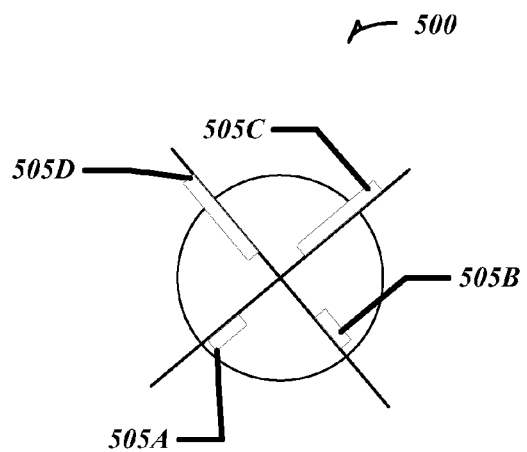

FIGS. 5A and B illustrate an example of a four-way RFID multi-tag 500. FIG. 5A illustrates a perspective view and FIG. 5B illustrates a top view of the four-way RFID multi-tag 500. As shown, RFID tags 505A and 505B are vertically oriented and RFID tags 505C and 505D are horizontally oriented. Other possible orientations or numbers of RFID tags are also contemplated.

In an example, at least one of the target(s) or the reference location(s) can include an RFID tag cluster, including a plurality of RFID tags, such as those illustrated with respect to FIGS. 3 through 5B.

Figure 6:
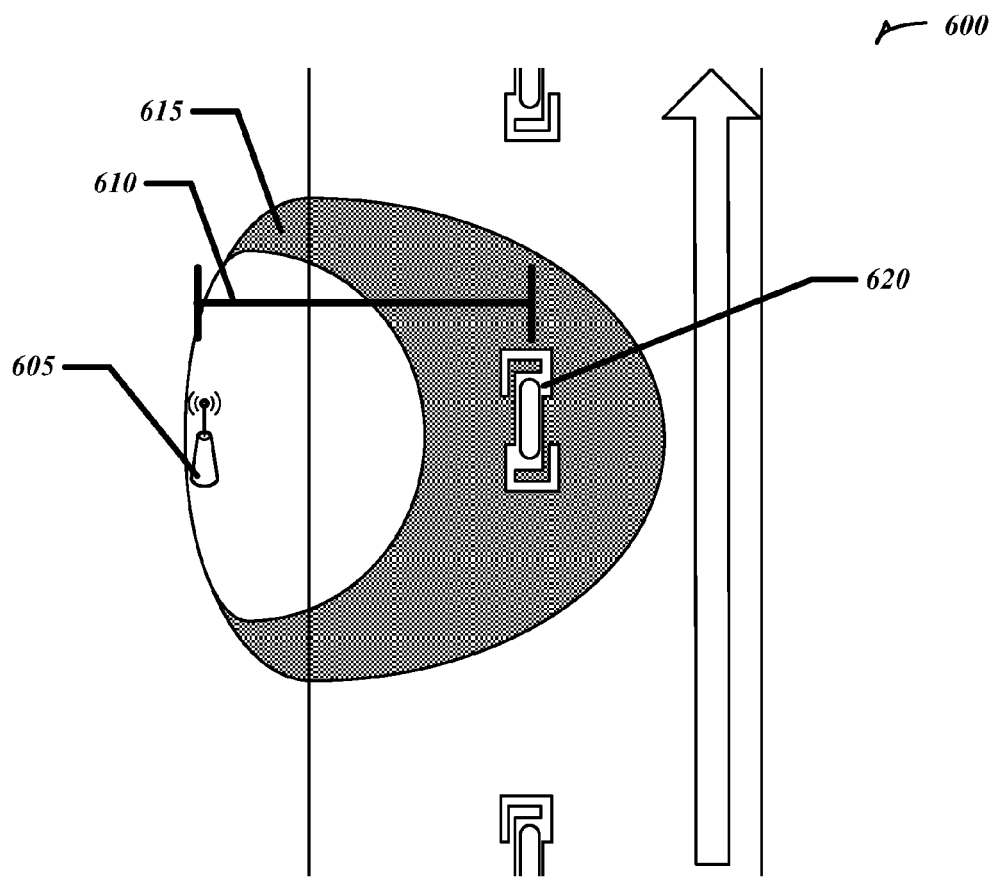
FIG. 6 illustrates generally an example of a system to categorize RFID tags using variable RFID reader transmission power, according to an embodiment.

FIG. 6 illustrates an example of a system 600 to categorize RFID tags using variable RFID reader 605 transmission power. In this example, the RFID tags, such as RFID tag 620, are positioned at a known distance 610 from the RFID reader 605. The transmission power level can be varied (e.g., similar to the transmission power level searches described in other examples) until a measurement power level 615 for the RFID tag 620 is found. In an example, multiple RFID tags can be simultaneously categorized by placing them at the known distance 610 from the RFID reader 605 and recording the cumulative read counts (e.g., successful interrogations) over a given time period (e.g., sixty seconds) at a given transmission power level (e.g., transmission power level 615) and repeating the process at different transmission power levels. In an example, results from different power levels can be correlated to categorize the RFID tags. For example, if an RFID tag has a low sensitivity at a high transmission power level, it can remain categorized as low sensitivity even if the RFID tag performed better at a lower transmission power level.

Figure 7:
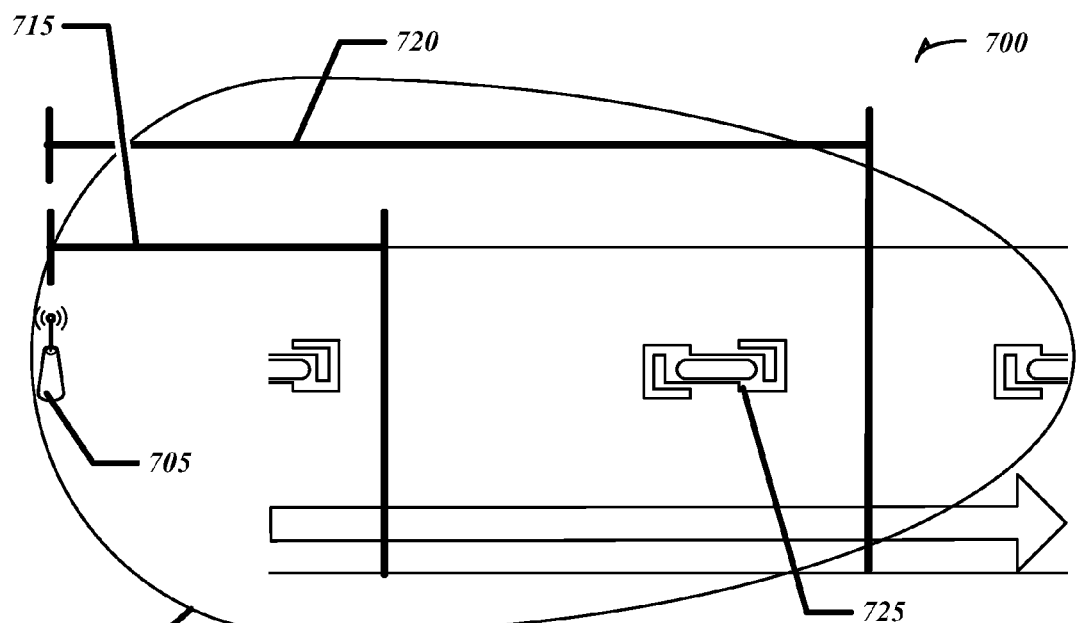
FIG. 7 illustrates generally an example of a system to categorize RFID tags using fixed RFID reader transmission power, according to an embodiment.

FIG. 7 illustrates an example of a system 700 to categorize RFID tags using fixed RFID reader 705 transmission power 710. In this example, distance between the RFID tags (e.g., RFID tag 625) can be varied while the transmission power 710 remains constant. In an example, the RFID tag 725 can be moved from distance 715 to distance 720, for example, with categorization being performed at each distance. In an example, the categorization can be performed on multiple RFID tags simultaneously by, for example, recording read counts at each distance 715 through 720. In an example, the last, or near the last distance, if RFID tag 725 is moving away from the RFID reader 705, can represent the category (e.g., the further away from the RFID reader 715 that the RFID tag 725 respond, the higher the sensitivity category is assigned to the RFID tag 725). The RFID tag 725 can also or instead be moved towards the reader. For example, the closer the RFID tag 725 is to the RFID reader 705 when it first responds, the lower the sensitivity category assigned to it becomes. In addition to systems 600 and 700, other parameters, such as RFID tag 725 or RFID reader 705 antenna orientation can be manipulated alone, or in addition to systems 600 and 700 to categorize the RFID tags.

In an example, any of systems 100, 200, 600, or 700 can optionally include a graphical user interface (GUI) to visualize or control any or all of the systems' parameters. In an example, the GUI is cross-platform (e.g., it includes similar visualizations and capabilities when implemented across more than one platform, such as including personal computers, smart phones, tablets, etc.) In an example, the GUI can be configured to provide a user real-time visualizations of the environment allowing quick identification of various issues, including the identification or correction of low-accuracy regions, the discovery of improved tag placement strategies, or to provide other useful information. The GUI can contain any combination of five regions: an interface element configured to enable the user to select one of a plurality of heuristics; a canvas configured to visualize localization error per location (e.g., graphically or analytically); an interface element configured to control environmental variables (e.g., antenna power, reference locations, etc.). For example, a user can use the GUI to determine the target localization accuracy at various points in the environment. Areas with low localization accuracy can then be enhanced, for example, by adding additional tags, such as low-cost passive tags.

Figure 8:
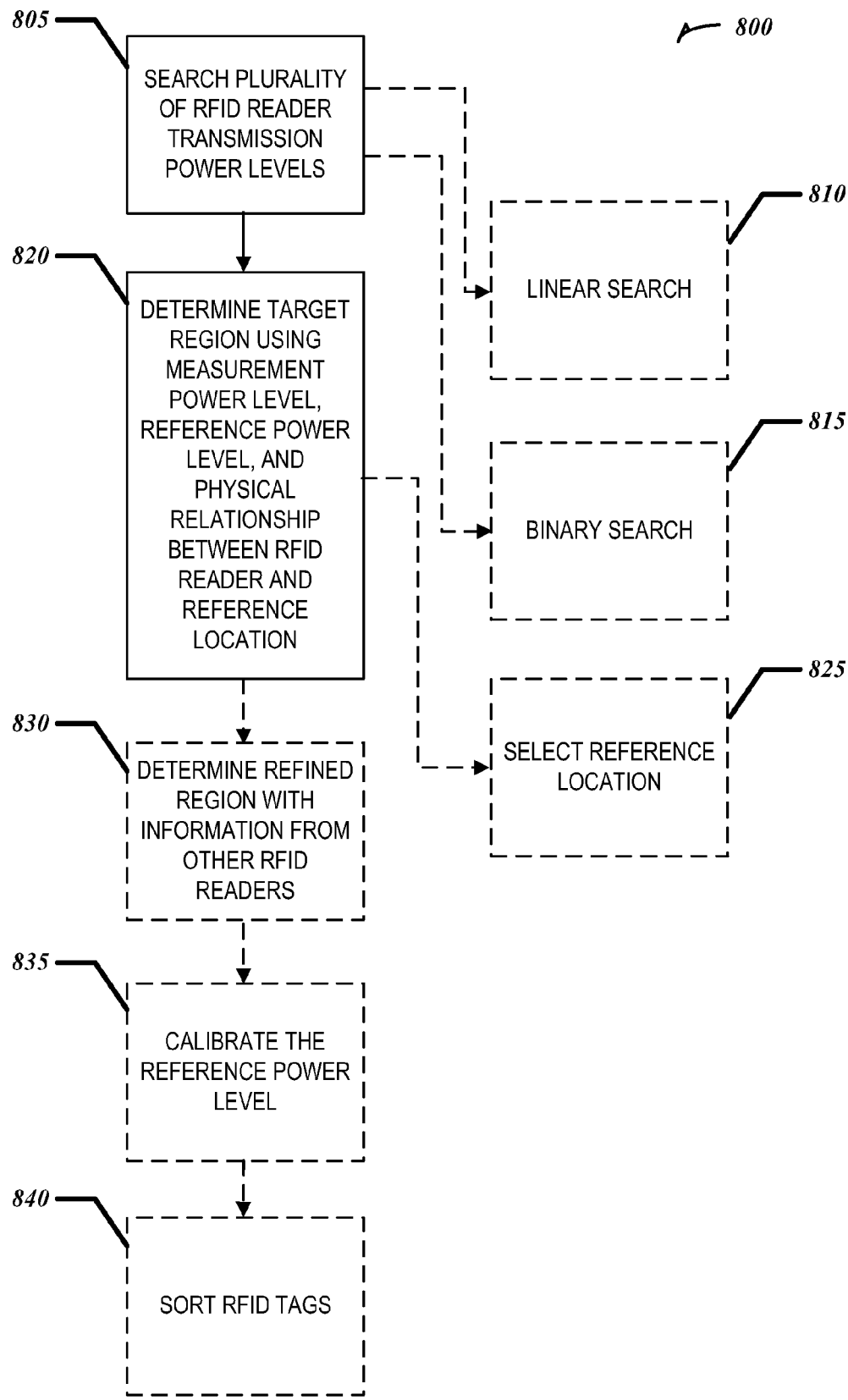
FIG. 8 illustrates generally a flowchart of an example of a method for object localization with an RFID infrastructure, according to an environment.

FIG. 8 is a flowchart of an example of a method 800 for object localization with an RFID infrastructure. Portions or techniques discussed above in relation to one or more of FIGS. 1 through 7 can be used to perform various techniques described below.

At 805, a plurality of transmission power levels established by an RFID reader 115 can be searched (e.g., using the search circuit 105) corresponding to a target 120. In an example, the measurement power level is a transmission power level established by the RFID reader 115 to interrogate the target 120 at or near a limit of the target's sensitivity (such as described above). In an example, the target can be stationary or mobile, and can include one or more RFID tags, or an RFID reader configured to perform measure and report operations as described above.

At 810, searching the plurality of transmission points can optionally include linearly searching the plurality of transmission power levels to determine the measurement power level.

At 815, searching the plurality of transmission points can optionally include a binary search of the plurality of transmission power levels to determine the measurement power level. In an example, at 815 or 810, one or more other search techniques (e.g., parallel transmission power level search or a parallel target search) can be used to perform the searching at 805.

At 820, a region that includes the target 120 can be determined (e.g., using the target localization circuit 110) using information about a physical relationship 140 between the RFID reader 115 and a reference location (e.g., R2 125B) via correlating the measurement power level to a reference power level corresponding to the reference location.

At 825, the reference location can optionally be selected from a plurality of reference locations via determining a greater affinity between the measurement power level and the reference power level than between the measurement power level and other reference power levels corresponding to other respective reference locations. In an example, the degree of affinity can be defined via a metric, method, or heuristic, such as those discussed in the examples above.

At 830, optionally, a refined region that includes the target 120 can be defined (e.g., using the target localization circuit 110) using information about two or more regions established using respective measurement power levels determined corresponding to respective RFID readers. In an example, the refined region can be the intersection of geographic representations or the regions, or via the techniques described above with respect to FIG. 2, among others.

At 835, optionally, the reference power level can be periodically calibrated (e.g., using the reference power calibration circuit 145) by searching the plurality of transmission power levels for the reference power level. The reference power level can be a transmission power level established by the RFID reader 115 to interrogate the reference location (e.g., R1 125A) at or near the reference location's sensitivity.

At 840, optionally, a plurality of RFID tags can be sorted (e.g., using the sorting circuit 150) into one or more categories (e.g., as described above). In an example, method 800 can be modified at 805 such that determining the region includes using information about a categorization of one or more of an RFID tag located at or near the target or an RFID tag located at or near the reference location. In an example, the target 120 and reference locations comprise respective RFID tags comprising the same category of sensitivity range.

Figure 9:
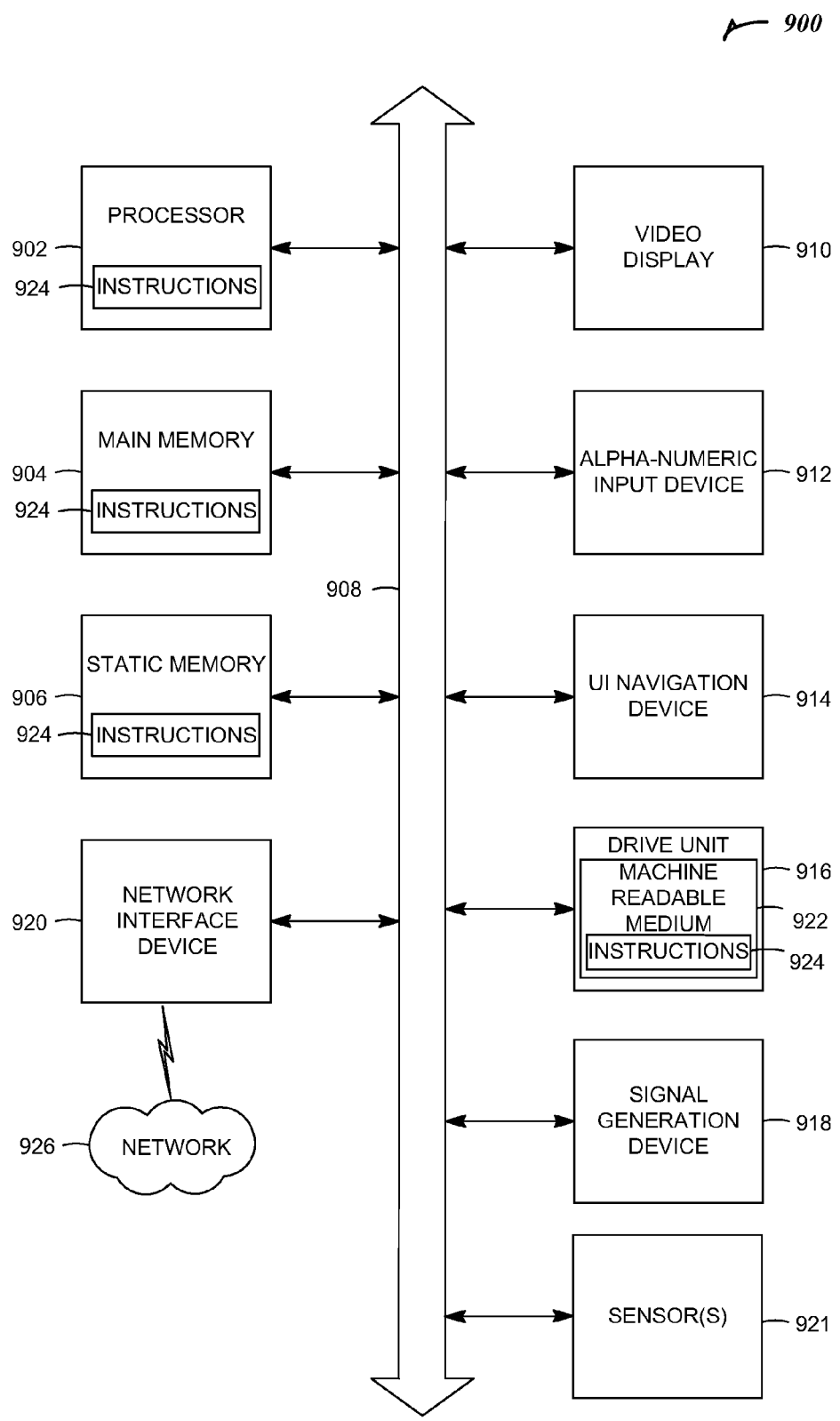
FIG. 9 is a block diagram illustrating generally an example of a machine upon which one or more embodiments can be implemented.

FIG. 9 illustrates a block diagram of an example machine 900 upon which one or more embodiments (e.g., discussed methodologies) can be implemented (e.g., run).

Examples of machine 900 can include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine 900) and software architectures that can be deployed in example embodiments.

In an example, the machine 900 can operate as a stand-alone device or the machine 900 can be connected (e.g., networked) to other machines.

In a networked deployment, the machine 900 can operate in the capacity of either a server or a client machine in server-client network environments. In an example, machine 900 can act as a peer machine in peer-to-peer (or other distributed) network environments. The machine 900 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by the machine 900. Further, while only a single machine 900 is illustrated, the term "machine" shall also be taken to include any collection of machines that individually or jointly execute a set (or multiple sets) of instructions to perform any one or more of the methodologies discussed herein.

Example machine (e.g., computer system) 900 can include a processor 902 (e.g., a central processing unit (CPU), a graphics processing unit (GPU) or both), a main memory 904 and a static memory 906, some or all of which can communicate with each other via a bus 908. The machine 900 can further include a display unit 910, an alphanumeric input device 912 (e.g., a keyboard), and a user interface (UI) navigation device 911 (e.g., a mouse). In an example, the display unit 810, input device 917 and UI navigation device 914 can be a touch screen display. The machine 900 can additionally include a storage device (e.g., drive unit) 916, a signal generation device 918 (e.g., a speaker), a network interface device 920, and one or more sensors 921, such as a global positioning system (GPS) sensor, compass, accelerometer, or other sensor.

The storage device 916 can include a machine readable medium 922 on which is stored one or more sets of data structures or instructions 924 (e.g., software) embodying or utilized by any one or more of the methodologies or functions described herein. The instructions 924 can also reside, completely or at least partially, within the main memory 904, within static memory 906, or within the processor 902 during execution thereof by the machine 900. In an example, one or any combination of the processor 902, the main memory 904, the static memory 906, or the storage device 916 can constitute machine readable media.

While the machine readable medium 922 is illustrated as a single medium, the term "machine readable medium" can include a single medium or multiple media (e.g., a centralized or distributed database, and/or associated caches and servers) that configured to store the one or more instructions 924. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 924 can further be transmitted or received over a communications network 926 using a transmission medium via the network interface device 920 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

Additional Notes & Examples

Example 1 includes subject matter (such as a system) comprising a search circuit configured to search a plurality of transmission power levels established by a radio-frequency identification (RFID) reader, the search circuit configured to determine a measurement power level corresponding to a target. The subject matter of Example 1 can also include a target localization circuit configured to determine a region that includes the target using information about a physical relationship between the RFID reader and a reference location via correlating the measurement power level to a reference power level corresponding to the reference location.

In Example 2, the subject matter of Example 1 can optionally include wherein the measurement power level is a transmission power level established by the RFID reader to interrogate the target at or near a limit of the target's sensitivity.

In Example 3, the subject matter of one or any of Examples 1-2 can optionally include wherein the localization circuit is configured to select the reference location from a plurality of reference locations via determining a greater affinity between the measurement power level and the reference power level than between the measurement power level and other reference power levels corresponding to other respective reference locations.

In Example 4, the subject matter of one or any of Examples 1-3 can optionally include wherein the search circuit is configured to use a linear search to search the plurality of transmission power levels to determine the measurement power level.

In Example 5, the subject matter of one or any of Examples 1-4 can optionally include wherein the search circuit is configured to use a binary search to search the plurality of transmission power levels to determine the measurement power level.

In Example 6, the subject matter of one or any of Examples 1-2 can optionally include wherein the localization circuit is configured to determine a refined region that includes the target using information about two or more regions established using respective measurement power levels determined corresponding to respective RFID readers.

In Example 7, the subject matter of one or any of Examples 1-6 can optionally include a reference power calibration circuit configured to search the plurality of transmission power levels for the reference power level, the reference power level being a transmission power level established by the RFID reader to interrogate the reference location at or near the limit of the references location's sensitivity.

In Example 8, the subject matter of one or any of Examples 1-7 can optionally include wherein at least one of the target or the reference location includes an RFID tag cluster, the RFID tag cluster including at least two RFID tags positioned orthogonally to each other.

In Example 9, the subject matter of one or any of Examples 1-8 can optionally include comprising a sorting circuit configured to classify a plurality of RFID tags into one or more categories, wherein the localization circuit is configured to determine the region that includes the target using information about the physical relationship between the RFID reader and the reference location, and information about a classification of one or more of an RFID tag located at or near the target, or an RFID tag located at or near the reference location.

In Example 10, the subject matter of Example 9 can optionally include wherein the target and reference location comprise respective RFID tags comprising the same category of sensitivity range.

Example 11 can include, or can optionally be combined with the subject matter of one or any combination of Examples 1-10 to include, subject matter (such as a method, means for performing acts, or a machine-readable medium including instruction that, when performed by the machine cause the machine to perform acts) comprising searching a plurality of transmission power levels established by a radio-frequency identification (RFID) reader to determine a measurement power level corresponding to a target, and determining a region that includes the target using information about a physical relationship between the RFID reader and a reference location via correlating the measurement power level to a reference power level corresponding to the reference location.

In Example 12, the subject matter of Examples 11 can optionally include wherein the measurement power level is a transmission power level established by the RFID reader to interrogate the target at or near a limit of the target's sensitivity.

In Example 13, the subject matter of one or any of Examples 11-12 can optionally include wherein the reference location is selected from a plurality of reference locations via determining a greater affinity between the measurement power level and the reference power level than between the measurement power level and other reference power levels corresponding to other respective reference locations.

In Example 14, the subject matter of one or any of Examples 11-13 can optionally include wherein searching the plurality of transmission points includes linearly searching the plurality of transmission power levels to determine the measurement power level.

In Example 15, the subject matter of one or any of Examples 11-14 can optionally include wherein searching the plurality of transmission points includes a binary search of the plurality of transmission power levels to determine the measurement power level.

In Example 16, the subject matter of one or any of Examples 11-15 can optionally include determining a refined region that includes the target using information about two or more regions established using respective measurement power levels determined corresponding to respective RFID readers.

In Example 17, the subject matter of one or any of Examples 11-16 can optionally include periodically calibrating the reference power level by searching the plurality of transmission power levels for the reference power level, the reference power level being a transmission power level established by the RFID reader to interrogate the reference location at or near the reference location's sensitivity.

In Example 18, the subject matter of one or any of Examples 11-17 can optionally include wherein at least one of the target and the reference location includes an RFID tag cluster, the RFID tag cluster including at least two RFID tags positioned orthogonally to each other.

In Example 19, the subject matter of one or any of Examples 11-18 can optionally include sorting a plurality of RFID tags into one or more categories, wherein determining the region includes using information about a categorization of one or more of an RFID tag located at or near the target or an RFID tag located at or near the reference location.

In Example 20, the subject matter of Example 19 can optionally include wherein the target and reference locations comprise respective RFID tags comprising the same category of sensitivity range.

Example 21 can include, or can optionally be combined with the subject matter of one or any combination of Examples 1-20 to include, subject matter (such as a method, means for performing acts, or a machine-readable medium including instruction that, when performed by the machine cause the machine to perform acts) comprising cause a machine to calibrate a reference power level corresponding to a reference location by searching a plurality of transmission power levels established by a radio-frequency identification (RFID) reader for the reference power level, the reference power level being a transmission power level established by the RFID reader to interrogate the reference location at or near the reference location's sensitivity, searching the plurality of transmission power levels to determine a measurement power level corresponding to a target, the measurement power level being a transmission power level established by the RFID reader to interrogate the target at or near a limit of the target's sensitivity, determining a region that includes the target using information about a physical relationship between the RFID reader and the reference location via correlating the measurement power level to the reference power level, and determine a refined region that includes the target by intersecting the region with a second region corresponding to a second RFID reader.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A system comprising:
a search circuit configured to search a plurality of transmission power levels established by a radio-frequency identification (RFID) reader, the search circuit configured to determine a measurement power level corresponding to a target, wherein to search the plurality of transmission power levels the search circuit uses at least one of a linear search or a binary search, wherein the linear search uses variable power step sizes to establish a fixed number of intervals within a variable power range, and wherein the binary search halves step sizes during each iteration of the search; and a target localization circuit configured to:
 select a reference location from a plurality of reference locations via determining a greater affinity between the measurement power level and a reference power level corresponding to a reference location than between the measurement power level and other reference power levels corresponding to other respective reference locations; and
 determine a region that includes the target using information about a physical relationship between the RFID reader and the reference location via correlating the measurement power level to the reference power level, wherein the physical relationship between the RFID reader and the reference location is fixed with respect to the reference power level that was previously established via interrogation of the reference location by the RFID reader at a fixed position, and wherein the affinity between the measurement power level and the reference power level is determined by a heuristic selected from a group of heuristics that includes:

$$H_1 : \min_{\forall J} \left( \sum_{I=1}^{M} \Delta_I(R_J) \right);$$

$$H_2 : \min_{\forall J,K; J \neq K} \left( \sum_{I=1}^{M} \Delta_I(R_J) + \sum_{I=1}^{M} \Delta_I(R_K) \right);$$

$$H_3 : \min_{\forall J, K \in B; J \neq K} \left( \sum_{I=1}^{M} \Delta_I(R_J) + \sum_{I=1}^{M} \Delta_I(R_K) \right);$$

$$H_5 : \min_{\forall J,K; J \neq K} (\Delta_J(T) + \Delta_K(T));$$

$$H_6 : \min_{\forall J,K; J \neq K} (\Delta_J(T) + \Delta_K(T));$$

$$H_7 : \min_{\forall J} \left( \sqrt{\sum_{I=1}^{M} \Delta_I(R_J)^2} \right);$$

$$H_8 : \min_{\forall J,K; J \neq K} \left( \sqrt{\sum_{I=1}^{M} \Delta_I(R_J)^2} + \sqrt{\sum_{I=1}^{M} \Delta_I(R_K)^2} \right);$$

$$H_9 : \min_{\forall J, K \in B; J \neq K} \left( \sqrt{\sum_{I=1}^{M} \Delta_I(R_J)^2} + \sqrt{\sum_{I=1}^{M} \Delta_I(R_K)^2} \right);$$

$$H_{10} : \min_{\forall J, K \in B; J \neq K} \left( \sqrt{\sum_{I=1}^{M} \Delta_I(R_J)^2} + \sqrt{\sum_{I=1}^{M} \Delta_I(R_K)^2} \right) \text{ s.t. } \sqrt{\sum_{I=1}^{M} \Delta_I(R_J)^2} < \sqrt{\sum_{I=1}^{M} \Delta_I(R_K)^2} \text{ ; or}$$

$$H_{11} : \min_{\forall L}(H_L);$$

wherein:
 T=Target;
 J,K=Iteration variables for neighbourhood reference locations;
 $R_J$=Reference location J;
 $R_K$=Reference location K;
 $\Delta_I(R)$=|Power(T)−Power(R)| using reader I, wherein Power is the transmission power level;
 M=Number of RFID readers used;
 B=Set of neighbour reference locations;
 H=Heuristic; and
 L=Iteration variable for heuristics.

2. The system of claim 1, wherein the measurement power level is a transmission power level established by the RFID reader to interrogate the target at or near a limit of the target's sensitivity.

3. The system of claim 1, wherein the search circuit is configured to first use the binary search to converge on a transmission power range and then use the linear search with a step size adjusted to the transmission power range from the binary search to determine the measurement power level.

4. The system of claim 1, wherein the localization circuit is configured to determine a refined region that includes the target using information about two or more regions established using respective measurement power levels determined corresponding to respective RFID readers.

5. The system of claim 1, further comprising a reference power calibration circuit configured to search the plurality of transmission power levels for the reference power level, the reference power level being a transmission power level established by the RFID reader to interrogate the reference location at or near the limit of the references location's sensitivity.

6. The system of claim 1, further comprising a sorting circuit configured to classify a plurality of RFID tags into one or more categories, wherein the localization circuit is configured to determine the region that includes the target using information about the physical relationship between the RFID reader and the reference location, and information about a classification of one or more of an RFID tag located at or near the target, or an RFID tag located at or near the reference location.

7. The system of claim 6, wherein the target and reference location comprise respective RFID tags comprising the same category of sensitivity range.

8. A method comprising:
 searching a plurality of transmission power levels established by a radio-frequency identification (RFID) reader to determine a measurement power level corresponding to a target, wherein searching the plurality of transmission power levels includes using at least one of a linear search or a binary search, wherein the linear search uses variable power step sizes to establish a fixed number of intervals within a variable power range, and wherein the binary search halves step sizes during each iteration of the search; and
 determining a region that includes the target using information about a physical relationship between the RFID reader and a reference location via correlating the measurement power level to a reference power level corresponding to the reference location, wherein the physical relationship between the RFID reader and the reference location is fixed with respect to the reference power level that was previously established via interrogation of the reference location by the RFID reader at a fixed position, wherein the reference location is selected from a plurality of reference locations via determining a greater affinity between the measurement power level and the reference power level than between the measurement power level and other reference power levels corresponding to other respective reference locations, and wherein the affinity between the measurement power level and the reference power level is determined by a heuristic selected from a group of heuristics that includes:

$$H_1 : \min_{\forall J}\left(\sum_{I=1}^{M}\Delta_I(R_J)\right);$$

$$H_2 : \min_{\forall J,K;J\neq K}\left(\sum_{I=1}^{M}\Delta_I(R_J) + \sum_{I=1}^{M}\Delta_I(R_K)\right);$$

$$H_3 : \min_{\forall J,K\in B;J\neq K}\left(\sum_{I=1}^{M}\Delta_I(R_J) + \sum_{I=1}^{M}\Delta_I(R_K)\right);$$

$$H_5 : \min_{\forall J,K;J\neq K}(\Delta_J(T) + \Delta_K(T));$$

$$H_6 : \min_{\forall J,K;J\neq K}(\Delta_J(T) + \Delta_K(T));$$

$$H_7 : \min_{\forall J}\left(\sqrt{\sum_{I=1}^{M}\Delta_I(R_J)^2}\right);$$

$$H_8 : \min_{\forall J,K;J\neq K}\left(\sqrt{\sum_{I=1}^{M}\Delta_I(R_J)^2} + \sqrt{\sum_{I=1}^{M}\Delta_I(R_K)^2}\right);$$

$$H_9 : \min_{\forall J,K\in B;J\neq K}\left(\sqrt{\sum_{I=1}^{M}\Delta_I(R_J)^2} + \sqrt{\sum_{I=1}^{M}\Delta_I(R_K)^2}\right);$$

$$H_{10} : \min_{\forall J,K\in B;J\neq K}\left(\sqrt{\sum_{I=1}^{M}\Delta_I(R_J)^2} + \sqrt{\sum_{I=1}^{M}\Delta_I(R_K)^2}\right) \text{ s.t. } \sqrt{\sum_{I=1}^{M}\Delta_I(R_J)^2} < \sqrt{\sum_{I=1}^{M}\Delta_I(R_K)^2} \text{ ; or}$$

$$H_{11} : \min_{\forall L}(H_L);$$

wherein:
T=Target;
J,K=Iteration variables for neighbourhood reference locations;
$R_J$=Reference location J;
$R_K$=Reference location K;
$\Delta_I(R)$=|Power(T)−Power(R)| using reader I, wherein Power is the transmission power level;
M=Number of RFID readers used;
B=Set of neighbour reference locations;
H=Heuristic; and
L=Iteration variable for heuristics.

9. The method of claim 8, wherein the measurement power level is a transmission power level established by the RFID reader to interrogate the target at or near a limit of the target's sensitivity.

10. The method of claim 8, wherein searching the plurality of transmission points includes first using the binary search to converge on a transmission power range and then linearly searching with a step size adjusted to the transmission power range from the binary search to determine the measurement power level.

11. The method of claim 8, comprising determining a refined region that includes the target using information about two or more regions established using respective measurement power levels determined corresponding to respective RFID readers.

12. The method of claim 8, comprising periodically calibrating the reference power level by searching the plurality of transmission power levels for the reference power level, the reference power level being a transmission power level established by the RFID reader to interrogate the reference location at or near the reference location's sensitivity.

13. The method of claim 8, comprising sorting a plurality of RFID tags into one or more categories, wherein determining the region includes using information about a categorization of one or more of an RFID tag located at or near the target or an RFID tag located at or near the reference location.

14. The method of claim 13, wherein the target and reference locations comprise respective RFID tags comprising the same category of sensitivity range.

15. At least one non-transitory machine readable medium including instructions, which when executed by a machine, cause the machine to perform operations comprising:
searching a plurality of transmission power levels established by a radio-frequency identification (RFID) reader to determine a measurement power level corresponding to a target, wherein searching the plurality of transmission power levels includes using at least one of a linear search or a binary search, wherein the linear search uses variable power step sizes to establish a fixed number of intervals within a variable power range, and wherein the binary search halves step sizes during each iteration of the search; and
determining a region that includes the target using information about a physical relationship between the RFID reader and a reference location via correlating the measurement power level to a reference power level corresponding to the reference location, wherein the physical relationship between the RFID reader and the reference location is fixed with respect to the reference power level that was previously established via interrogation of the reference location by the RFID reader at a fixed position, wherein the reference location is selected from a plurality of reference locations via determining a greater affinity between the measurement power level and the reference power level than between the measurement power level and other reference power levels corresponding to other respective reference locations, and wherein the affinity between the measurement power level and the reference power level is determined by a heuristic selected from a group of heuristics that includes:

$$H_1 : \min_{\forall J}\left(\sum_{I=1}^{M}\Delta_I(R_J)\right);$$

$$H_2 : \min_{\forall J,K;J\neq K}\left(\sum_{I=1}^{M}\Delta_I(R_J) + \sum_{I=1}^{M}\Delta_I(R_K)\right);$$

$$H_3 : \min_{\forall J,K\in B;J\neq K}\left(\sum_{I=1}^{M}\Delta_I(R_J) + \sum_{I=1}^{M}\Delta_I(R_K)\right);$$

$$H_5 : \min_{\forall J,K;J\neq K}(\Delta_J(T) + \Delta_K(T));$$

$$H_6 : \min_{\forall J,K;J\neq K}(\Delta_J(T) + \Delta_K(T));$$

$$H_7 : \min_{\forall J}\left(\sqrt{\sum_{I=1}^{M}\Delta_I(R_J)^2}\right);$$

$$H_8 : \min_{\forall J,K;J\neq K}\left(\sqrt{\sum_{I=1}^{M}\Delta_I(R_J)^2} + \sqrt{\sum_{I=1}^{M}\Delta_I(R_K)^2}\right);$$

$$H_9 : \min_{\forall J,K\in B;J\neq K}\left(\sqrt{\sum_{I=1}^{M}\Delta_I(R_J)^2} + \sqrt{\sum_{I=1}^{M}\Delta_I(R_K)^2}\right);$$

$$H_{10} : \min_{\forall J,K\in B;J\neq K}\left(\sqrt{\sum_{I=1}^{M}\Delta_I(R_J)^2} + \sqrt{\sum_{I=1}^{M}\Delta_I(R_K)^2}\right) \text{ s.t. } \sqrt{\sum_{I=1}^{M}\Delta_I(R_J)^2} <$$

-continued $$\sqrt{\sum_{I=1}^{M} \Delta_I(R_K)^2} \; ; \; \text{or}$$

$$H_{11} : \min_{\forall L}(H_L);$$

wherein:
T=Target;
J,K=Iteration variables for neighbourhood reference locations;
$R_J$=Reference location J;
$R_K$=Reference location K;
$\Delta_I(R)$=|Power(T)−Power(R)| using reader I, wherein Power is the transmission power level;
M=Number of RFID readers used;
B=Set of neighbour reference locations;
H=Heuristic; and
L=Iteration variable for heuristics.

16. The machine readable medium of claim 15, wherein the measurement power level is a transmission power level established by the RFID reader to interrogate the target at or near a limit of the target's sensitivity.

17. The machine readable medium of claim 15, machine readable medium searching the plurality of transmission points includes first using the binary search to converge on a transmission power range and then linearly searching with a step size adjusted to the transmission power range from the binary search to determine the measurement power level.

18. The machine readable medium of claim 15, wherein the operations comprise determining a refined region that includes the target using information about two or more regions established using respective measurement power levels determined corresponding to respective RFID readers.

19. The machine readable medium of claim 15, wherein the operations comprise periodically calibrating the reference power level by searching the plurality of transmission power levels for the reference power level, the reference power level being a transmission power level established by the RFID reader to interrogate the reference location at or near the reference location's sensitivity.

20. The machine readable medium of claim 15, wherein the operations comprise sorting a plurality of RFID tags into one or more categories, wherein determining the region includes using information about a categorization of one or more of an RFID tag located at or near the target or an RFID tag located at or near the reference location.

21. The machine readable medium of claim 20, wherein the target and reference locations comprise respective RFID tags comprising the same category of sensitivity range.

* * * * *